United States Patent [19]
Jones et al.

[11] Patent Number: 5,447,401
[45] Date of Patent: Sep. 5, 1995

[54] FASTENER FOR SECURING A STRUCTURAL COMPONENT TO A CARPET PAD

[75] Inventors: Stephen W. Jones, Emporia, Kans.; Glenn A. Davis, San Diego, Calif.; David D. McCormick, Prairie Village, Kans.; James D. TerMeer, Kansas City, Mo.; Donald L. Rohrs, Overland Park, Kans.

[73] Assignee: Jasco, Inc., Emporia, Kans.

[21] Appl. No.: 140,427

[22] Filed: Oct. 25, 1993

[51] Int. Cl.⁶ .............................................. F16B 35/04
[52] U.S. Cl. .................................. 411/424; 411/411; 411/426
[58] Field of Search ............... 411/399, 411, 424, 426, 411/412, 413

[56] References Cited

U.S. PATENT DOCUMENTS

| | | | |
|---|---|---|---|
| 438,754 | 10/1890 | Rogers | 411/426 X |
| 471,179 | 3/1892 | Jones | 411/424 |
| 4,231,247 | 11/1980 | Haydon | 411/411 X |
| 4,536,117 | 8/1985 | Yamashiro | 411/411 |
| 4,878,792 | 11/1989 | Frano . | |
| 5,149,032 | 9/1992 | Jones et al. . | |
| 5,205,694 | 4/1993 | Nagoshi et al. | 411/399 |

FOREIGN PATENT DOCUMENTS

2853976  6/1980  Germany ..................... 411/413

OTHER PUBLICATIONS

Iron Age Periodical, "A New Screw" by The American Screw Co., p. 203 date–Feb. 2, 1888.

*Primary Examiner*—Neill R. Wilson
*Attorney, Agent, or Firm*—Hovey, Williams, Timmons & Collins

[57] ABSTRACT

A fastener is formed with an elongated threaded portion defined by a central shank and a thread formed on the shank, a neck collinear with the shank, and a head provided with a recess adapted to receive a tool for rotating the fastener. The shank of the threaded portion includes a cylindrical body and a tapered penetrating point extending longitudinally from the body. The thread is provided with a constant diameter section along the cylindrical body and a tapered section along the tapered penetrating point. The constant diameter section defines a major diameter that is more than about double the minor diameter defined by the body of the shank. The thread defines a pitch greater than the cross-sectional thickness of the thread along the shank so that the cylindrical shank is exposed within each pitch of the thread.

6 Claims, 1 Drawing Sheet

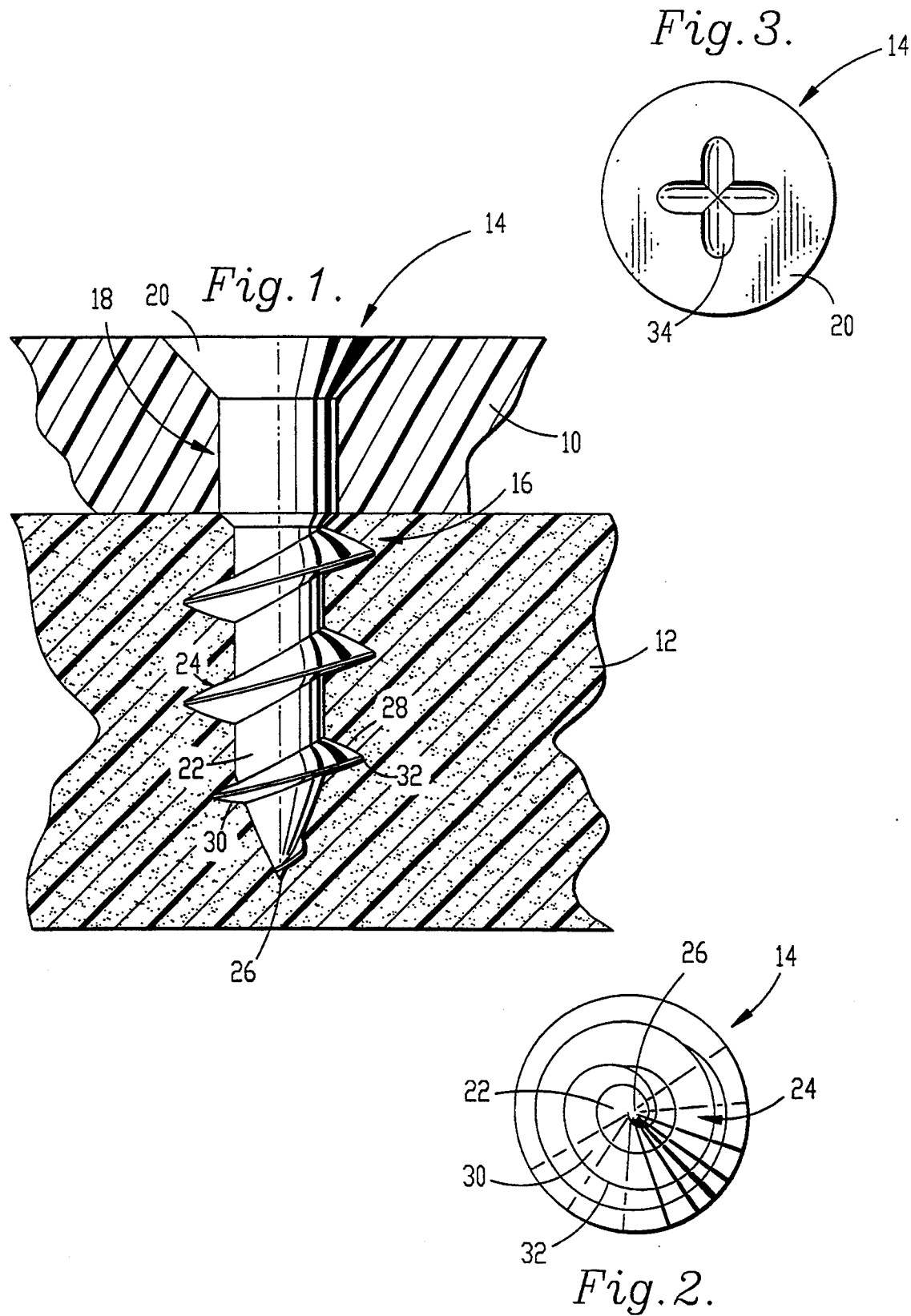

FASTENER FOR SECURING A STRUCTURAL COMPONENT TO A CARPET PAD

BACKGROUND OF THE INVENTION

1. Field of the Invention

The present invention relates generally to fasteners and, more particularly to a threaded fastener for securing a cup holder base or other structural component to a relatively porous, resilient, pad-like material such as a carpet pad of an automobile.

2. Discussion of the Prior Art

A conventional screw design includes a threaded shank provided with a large number of threads per inch of shank length, and a minor diameter only slightly smaller, wherein the minor diameter is defined as the diameter of the threaded shank at the root of each thread while the major diameter is the diameter at the crest of each thread.

Although such conventional designs work well in fastening components to wood or metal support members, foamed or padded materials such as carpets and the like present numerous problems to the use of these fasteners. For example, with respect to carpet used in automobiles, the padding of the carpet has a resilient, rubbery characteristic which inhibits penetration of conventional fasteners. In addition, although conventional fasteners are retained within the fibrous layer of such carpets, these fasteners are easily pulled from the padding and provide little support for a component secured to the carpet.

It is known to provide a special fastener for use in securing a removable mat to a car carpet, wherein the fastener includes, among other components, a thermoplastic post member formed as an auger so that the post member can be easily threaded or screwed into a car carpet. An example of such a fastener is provided in U.S. Pat. No. 4,878,792, issued 7 Nov. 1989, to Frano.

However, numerous drawbacks also exist with this known type of fastener. For example, the fastener includes several components which are employed together as an assembly, thus increasing the cost and complexity of the system. In addition, fasteners formed of thermoplastic material do not typically exhibit the same strength or load carrying capabilities as do metal fasteners of the same size.

OBJECTS AND SUMMARY OF THE INVENTION

It is an object of the present invention to provide a fastener having a construction which allows quick installation, while providing aggressive penetration and retention in a resilient, foamed material such as a car carpet pad.

Another object of the present invention is to provide a threaded fastener having a self-tapping, corkscrew design that easily penetrates pad-like materials while tapping a uniform thread into the material by which the fastener is retained against axially shifting relative to the pad-like material.

In accordance with these and other objects evident from the following detailed description of a preferred embodiment of the invention, a fastener comprises an elongated threaded portion defined by a central shank, and a thread formed on the shank. The shank includes a cylindrical body and a tapered penetrating point extending longitudinally from the body. The thread includes a constant diameter section along the cylindrical body and a tapered section along the tapered penetrating point. The constant diameter section defines a major diameter that is more than about double the minor diameter defined by the body of the shank. The thread defines a pitch greater than the cross-sectional thickness of the thread along the shank so that the cylindrical body is exposed within each pitch of the thread. The fastener also includes a neck collinear with the shank and including a diameter greater than the diameter of the shank and less than the diameter of the thread, and a head collinear with the shank and including a diameter greater than the diameter of the neck. The head includes a distal face provided with a recess adapted to receive a tool for rotating the fastener.

Numerous advantages are achieved through the use of this construction. For example, by providing a tapered penetrating point on the shank and a tapered thread section along the point, a fastener is provided which easily punctures and penetrates any pad-like material in which the fastener is to be secured.

In addition, by providing a thread having a diameter more than about double the diameter of the shank, and by providing a uniform pitch greater than the cross-sectional thickness of the thread along the shank, a corkscrew configuration results which taps a thread into the pad-like material a retains the fastener in place, restricting axial displacement thereof.

BRIEF DESCRIPTION OF THE DRAWINGS FIGURES

A preferred embodiment of the present invention is described in detail below, with reference to the attached drawing figures, wherein:

FIG. 1 is a side elevational view of a fastener;

FIG. 2 is a bottom plan view of the fastener; and

FIG. 3 is a top plan view of the fastener.

DETAILED DESCRIPTION OF THE PREFERRED EMBODIMENT

A fastener constructed in accordance with the preferred embodiment is shown in FIG. 1, which is adapted for use in retaining the base 10 of a cup holder or other support on the floor of an automobile by securing the base to a padded carpet 12 provided in the automobile.

An example of a cup holder with which the fastener finds particular application is disclosed in U.S. Pat. No. 5,149,032, issued 22 Sep. 1992, to Jones et al. This patent illustrates a universal cup holder which may be utilized to accommodate may different sized fluid containers as well as other useful accessories such as a clipboard or various sizes and types of pouches or other receptacles capable of being positioned on or suspended from the holder.

This particular cup holder includes a pair of spaced keyhole slots formed in the base of the holder, and these slots are shaped to receive a head of the fastener and to slide relative to the fastener to lock the base thereto. The disclosure of the Jones et al. patent is incorporated herein for purposes of describing one type of component capable of being secured to a pad-like material by a fastener constructed in accordance with the present invention.

As shown in FIG. 1, the fastener 14 is of unitary construction, including an elongated threaded portion 16, a neck 18, and a head 20. The threaded portion 16 is defined by a central shank 22 and a thread 24 formed on the shank. The shank 22 is preferably of a length corresponding to the total depth of the pad-like material 12 in which the fastener is to be secured, and includes a cylindrical body and a tapered penetrating point 26. The point 26 defines an angle of about 40°, and is adapted to pierce the pad-like material during installation of the fastener.

The total length of the shank is slightly shorter than the thickness of the pad-like material 12. Thus, for a pad having a thickness of about ⅝ inches, the total length of the shank is about 0.55 inches. By providing this construction, the fastener 14 penetrates the pad without protruding beyond the pad against the underlying metal layer of the automobile frame.

The body of the shank 22 is preferably formed with the smallest possible diameter so that the thread 24 presents a relatively large transverse thread surface to the pad-like material for improving retention of the fastener within the material. In the preferred embodiment, the diameter of the body of the shank 22, which is referred to as the minor diameter, is 0.140 inches. This size provides the desired amount of retention while maintaining the structural integrity of the fastener. The shank diameter may be smaller and still provide advantages over conventional fasteners so long as the shank provides sufficient structural rigidity to the fastener.

The thread 24 includes a constant diameter section co-extensive with the cylindrical body of the shank, and a tapered section extending along the tapered penetrating point. The constant diameter section defines a major diameter that is more than about double the minor diameter defined by the body of the shank. For example, where the shank is formed with a diameter of about 0.140 inches, the major diameter defined by the thread is about 0.300 inches.

The tapered section of the thread is shown in FIG. 2, and is formed of a diameter that shortens uniformly near the tip of the penetrating point. The thread merges with the point very near the tip so that tapping begins almost immediately after the fastener penetrates the material 12. The thread 24 includes a pair of opposed thread surfaces 28, 30, shown in FIG. 1, which are angled toward one another and intersect at the thread crest 32. According to the preferred embodiment, the thread surfaces 28, 30 are angled relative to one another by about 45°.

The fastener is advantageously formed of steel, such as a 1006 steel, and is shaped by cold working a blank piece of material before being block zinc plated. Prior to working of the fastener, the threaded portion has the same diameter as the neck. However, during working, the threads are formed by a die which rolls the blank material into threads, pushing steel along the shank from between the crests to increase the thread diameter.

The crest of the thread is defined by the steel which is pushed together by the die, and may actually include two spaced crests which define a very small valley or groove therebetween. This groove does not adversely affect the ability of the fastener to penetrate the pad-like material, and presents a more aggressive cutting edge than does a single crest since each edge of the double-crested thread has a more acute angle than the single crest. Accordingly, the double-crested embodiment is sometimes preferred.

The thread 24 also defines a pitch, which is the axial distance between adjacent thread crests. The pitch of the thread is greater than the cross-sectional thickness of the thread along the shank so that the cylindrical shank 22 is exposed within each pitch of the thread.

Preferably, the pitch is as small as six threads per inch or less so that the length of shank exposed within each pitch is about equal to the thickness of the thread along the shank.

By providing this spacing between each thread pitch, and by making the major diameter substantially greater than the minor diameter, large thread surfaces are exposed for gripping the pad-like material, and a construction results which allows aggressive penetration of the fastener and retention within the pad-like material.

The neck 18 is formed collinear with the shank 22 and includes a diameter greater than the diameter of the shank and less than the diameter of the thread. In addition, the neck is of a length sufficient to provide clearance for the component 10 to be secured to the pad-like material 12 so that the fastener may be passed through the component and threaded into the material, with the head 20 of the fastener sandwiching the component against the material. According to the preferred construction, where the fastener is used to secure the base of a cup holder to the carpet of an automobile, the neck is 0.200 inches long and includes a diameter of 0.186 inches.

The head 20 is also collinear with the shank 22, and includes a diameter greater than the diameter of the neck. Preferably, the head is tapered between the neck and a free distal face of the head, and a recess 34, shown in FIG. 3, is provided in the distal face and is adapted to receive a tool for rotating the fastener to thread the fastener into the pad-like material. If desired, the head may be formed of any other shape suitable for simplifying installation or improving the ability of the fastener to retain the component 10 on the pad-like material.

Although an X-shaped recess 34 is illustrated in FIG. 3, other shapes, such as a slot-shaped recess, may also be provided in order to allow any desired type of driving tool to be used in threading the fastener into the pad-like material.

The present invention has been described with reference to the preferred embodiment illustrated in the attached drawing figures. However, substitutions and equivalents may be employed herein without departing from the scope of the invention as recited in the claims.

What is claimed is:

1. A fastener for securing a structural component of a first predetermined thickness to a carpet pad having a second predetermined thickness, the fastener comprising:

an elongated threaded portion having a length less than the predetermined thickness of the carpet pad and being defined by a central shank and a thread formed on the shank;

the shank including a cylindrical body and a tapered penetrating point extending longitudinally from the body, the cylindrical body defining a minor diameter; the thread including a constant diameter section along the cylindrical body and a tapered section along the tapered penetrating point, the constant diameter section defining a major diameter that is more than about double the minor diameter;

the thread defining a pitch greater than the cross-sectional thickness of the thread along the shank so that the cylindrical shank is exposed within each pitch of the thread;

a neck collinear with the shank and having a length adapted to correspond to the thickness of the structural component to be fastened to the carpet pad, the neck including a diameter greater than the diameter of the shank and less than the diameter of the thread; and a head collinear with the shank and including a diameter greater than the diameter of the neck, and a distal face provided with a recess adapted to receive a tool for rotating the fastener into the carpet pad.

2. A fastener as recited in claim 1, wherein the minor diameter is about 0.140 inches and the major diameter is about 0.186 inches.

3. A fastener as recited in claim 1, wherein the pitch is 6 threads per inch along the length of the shank.

4. A fastener as recited in claim 1, wherein the neck has a length of 0.200 inches and a diameter of about 0.186 inches.

5. A fastener as recited in claim 1, wherein the thread includes a pair of opposed thread surfaces intersecting at a crest, the surfaces being angled relative to one another by a angle of about 45°.

6. A fastener as recited in claim 1, wherein the point defines a point angle of about 45°.

* * * * *